P. J. PAQUET.
GLASS FURNACE.
APPLICATION FILED DEC. 11, 1912.
1,131,788.
Patented Mar. 16, 1915.
4 SHEETS—SHEET 1.
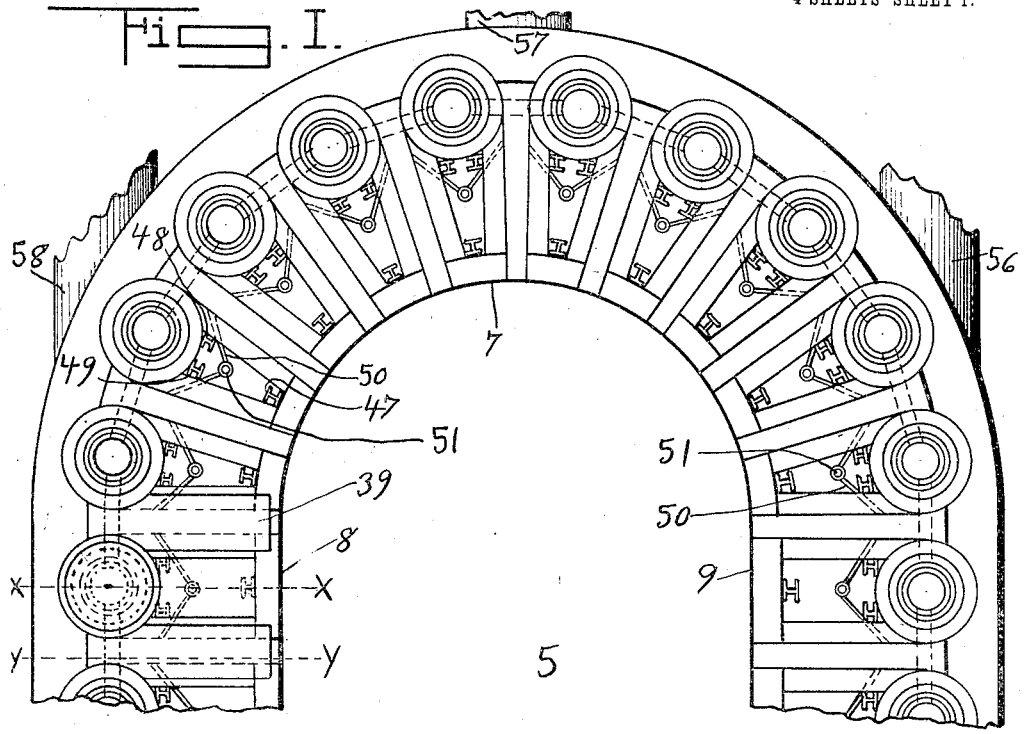
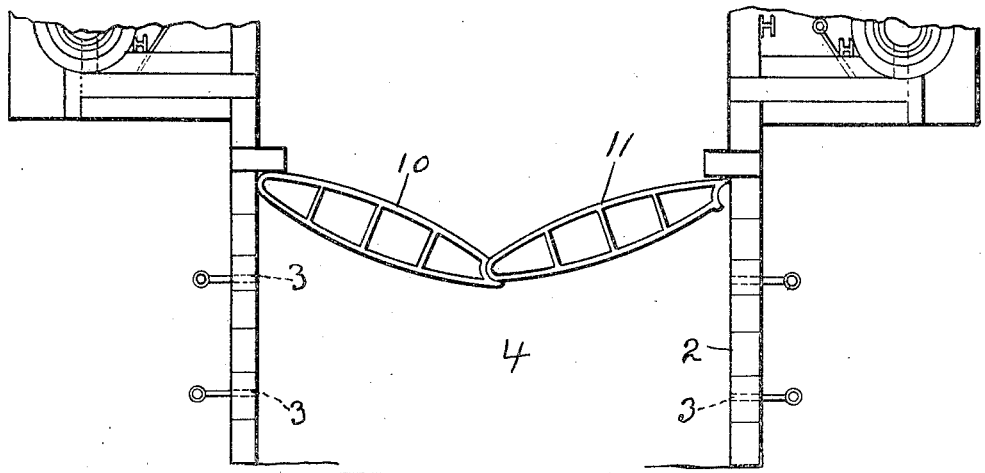
Witnesses
Inventor
P. J. Paquet
by A. M. Wilson
Attorney

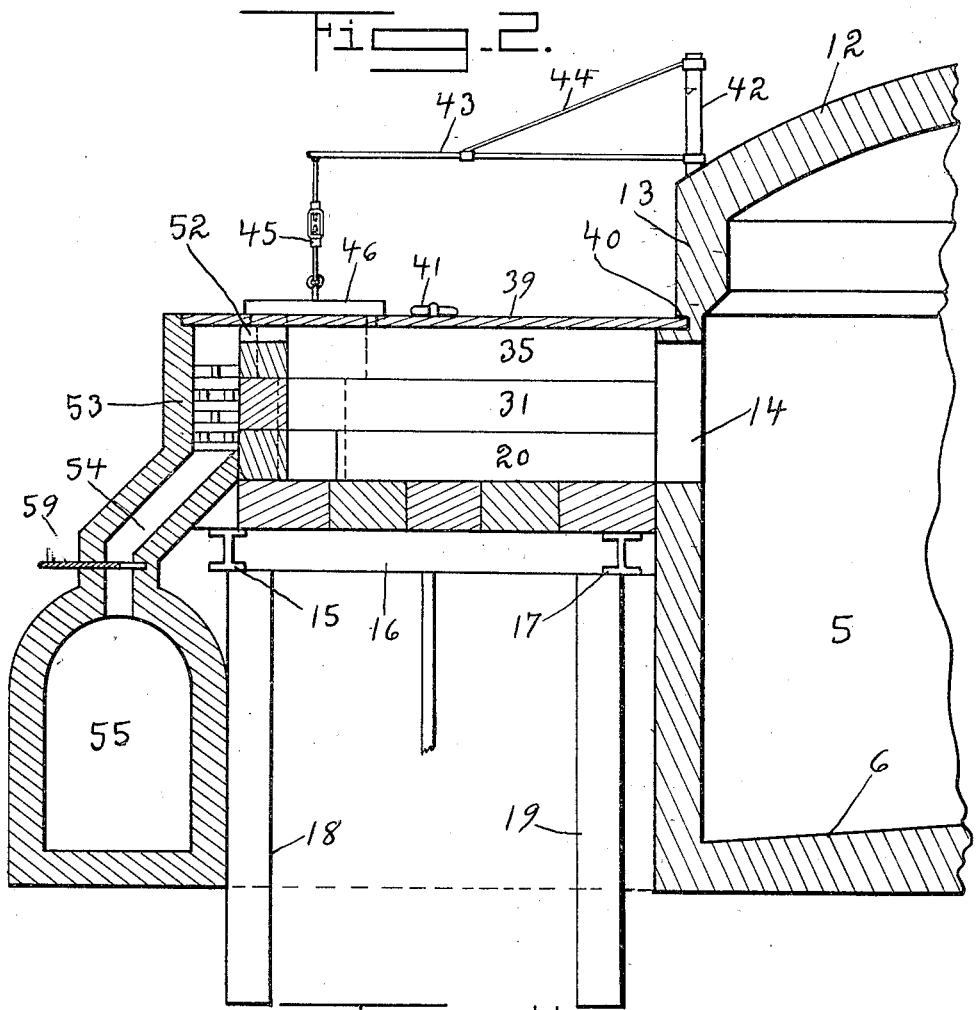

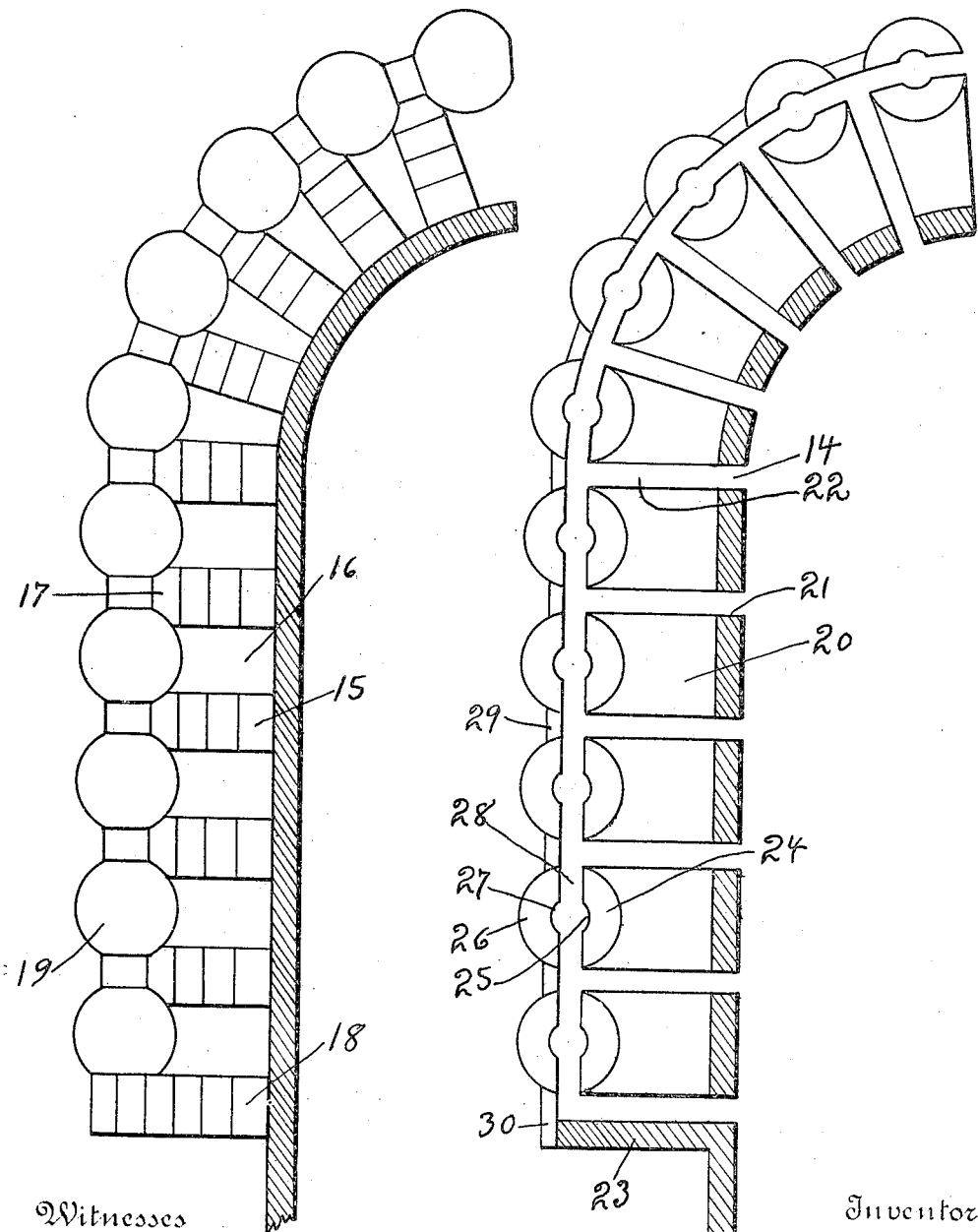

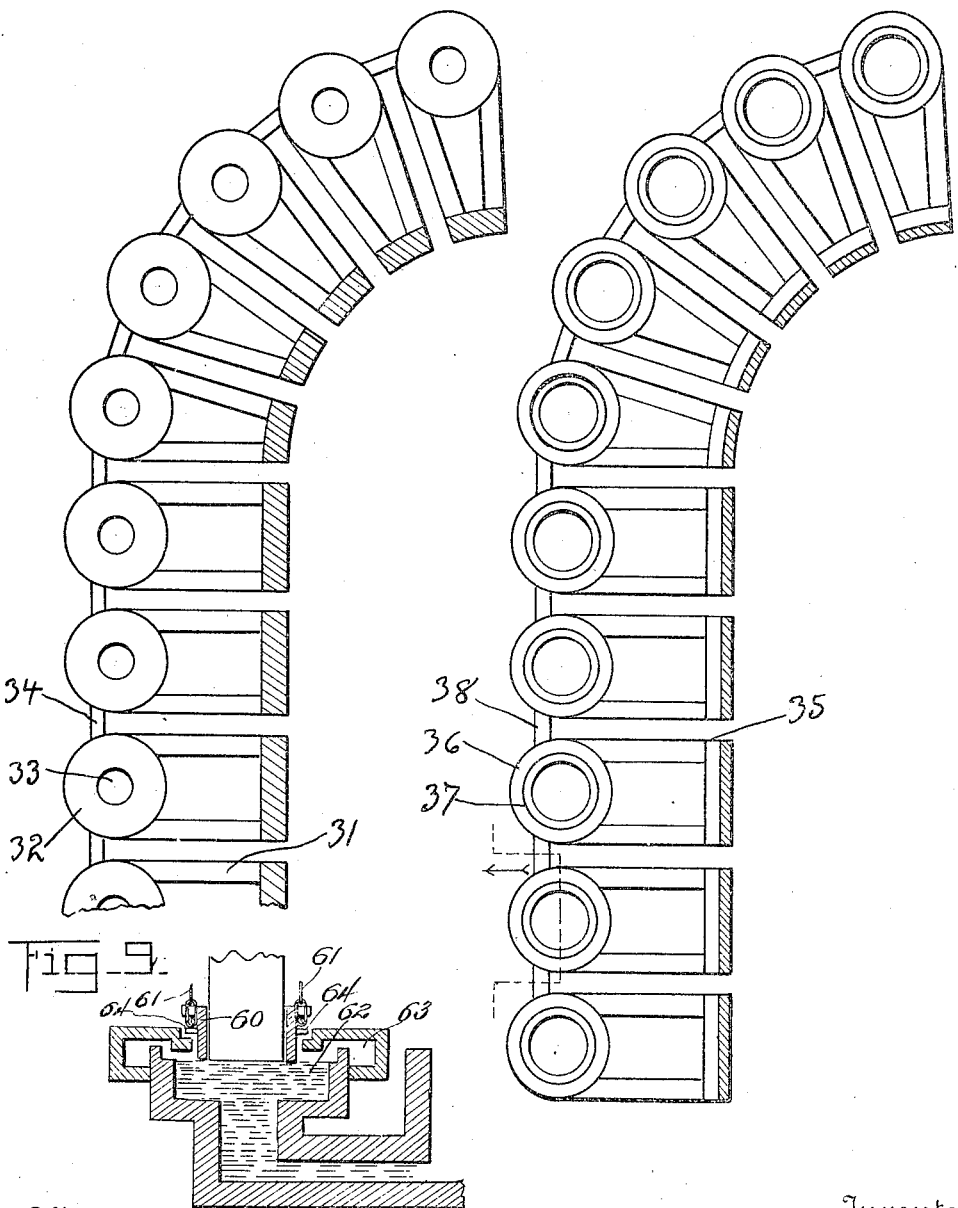

UNITED STATES PATENT OFFICE.

PIERRE J. PAQUET, OF JEANNETTE, PENNSYLVANIA.

GLASS-FURNACE.

1,131,788. Specification of Letters Patent. Patented Mar. 16, 1915.

Application filed December 11, 1912. Serial No. 736,226.

*To all whom it may concern:*

Be it known that I, PIERRE J. PAQUET, a citizen of the United States of America, residing at Jeannette, in the county of Westmoreland and State of Pennsylvania, have invented certain new and useful Improvements in Glass-Furnaces, of which the following is a specification.

This invention relates to glass furnaces of the regenerative type, and has for its object to provide a furnace of such class with a gathering chamber common to and communicating with a series of independent glass collecting pots from which the batches of glass are removed, such arrangement enabling a number of operators to gather simultaneously a series of batches of glass from the pots, whereby a considerable saving in time and expense, as well as an increase in output is obtained over the form of glass melting furnace now in general use.

A further object of the invention is to provide a glass furnace with a series of independent pots, from each of which is adapted to be removed a batch of glass, and furthermore to provide the furnace with means communicating with the pot ducts for carrying off the gases and fumes so that these latter will not interfere with the operators when removing the batches of glass from the pots.

A further object of the invention is to provide a glass furnace with novel means for heating the molten glass as it travels from the melting chamber to the pots so that when the glass is gathered from the pots it will be of proper consistency.

A further object of the invention is to provide a glass furnace of the class referred to which shall be comparatively simple in its construction and arrangement, conveniently operated, efficient in its use, and strong and durable in its structure, which will allow for the simultaneous removal of a plurality of batches of glass, and shall be comparatively inexpensive to set up.

With the foregoing and other objects in view, the invention consists of the novel construction, combination and arrangement of parts as hereinafter more specifically described and illustrated in the accompanying drawings, wherein is shown the preferred embodiment of the invention, but it is to be understood that changes, variations and modifications can be resorted to which come within the scope of the claims hereunto appended.

In the drawings, Figure 1 is a sectional plan of a glass melting furnace constructed in accordance with this invention and with the melting chamber broken away, Fig. 2 is a section on line Y—Y, Fig. 1, illustrating a portion in section of the gathering chamber, Fig. 3 is a section on line X—X, Fig. 1. Fig. 4 is a transverse sectional view, taken on the line Z—Z, Fig. 8, of one of the pots, also showing the removable lid therefor, Fig. 5 is a plan of one side of the base course of the glass collecting pots and also showing in section a portion of the wall of the melting chamber, Figs. 6 and 7 are like views of the middle courses, Fig. 8 is a plan of the upper course, and Fig. 9 is a detail sectional view showing the employment of a modified form of ring which acts as a barrier to prevent the heat entering through the annular heating chamber onto the upper surface of the glass in the pot from striking the cylinder being blown.

The melting chamber may be of any preferred contour and formed of any suitable material, but is shown as of rectangular shape and provided with side walls 1, 2, the end wall not being shown. The side walls 1, 2 of the melting chamber 4 have gas burners 3 mounted therein and the bottom of the chamber inclines downwardly toward the gathering chamber 5 having a bottom 6, a forward wall 7 and side walls 8, 9. The forward wall 7 is semi-circular in contour, and the walls 8, 9 form a continuation of the walls 1, 2 while the inclined bottom 6 forms a continuation of the bottom of the chamber 4. Arranged at the inner end of the melting chamber 4 is a pair of skimming frames 10 and 11, the function of which is to hold back any solid matter that is floating upon the molten glass in its passage from the melting chamber toward the gathering chamber. The top 12 of the gathering chamber is dome-shaped in contour and provided with a depending extension 13 which is seated upon the walls 7, 8 and 9 of the gathering chamber 5. The upper portion of the walls 7, 8 and 9 are formed with vertically disposed openings 14 which constitute outlets for the molten glass when the latter rises above a predetermined level, the molten glass passing through the outlets 14, Fig. 6 to the collecting pots to be presently referred to.

The collecting pots, any number of which may be employed, are worked in pairs by an operator and are disposed around the gathering chamber 5. When an operator is removing a batch of glass from one pot, the other pot is closed by means hereinafter referred to. The pots are mounted upon the supports 15, 16, 17, 18 and 19. The supports 18 and 19 are vertically disposed, the supports 15 and 17 spaced from each other and arranged in parallelism with respect to the gathering chamber 5, while the supports 16 extend transversely and are secured in a known manner to the supports 15 and 17, the supports 15, 16 and 17 being in the form of I-beams. The glass collecting pots are constructed of a series of courses of blocks of suitable material capable of withstanding the heat of the glass, four courses being herein shown. These courses are referred to generally by the reference characters A, B, C and D. The course A being the lower or base course, the courses B and C the middle and the course D the top, the courses A to D conforming in contour to the shape of the gathering chamber 5.

The base course A is formed from a series of rows or blocks $15^x$ which are spaced from each other and abut against the side and end walls of the gathering chamber 5, the spaces between the rows or blocks being indicated at $16^x$ Fig. 5 and the outer end of each of said rows, with the exception of the two end rows are reduced, as at $17^x$, the end rows being indicated by $18^x$.

Interposed between the outer ends of the rows $15^x$ and between each end row $18^x$ and adjacent row $15^x$ is a substantially circular block $19^x$.

The course B which is built upon the course A consists of a series of spaced blocks or slabs 20 which are mounted upon the rows or blocks $15^x$ of the course A, the width of the blocks or slabs being such as to be flush with the walls 21 of the openings 14, the spaces between the blocks or slabs 20 being indicated at 22. The end blocks or slabs 20 extend upon the end rows 18 of the course A and oppose right angular extensions 23 which project from the inner end of the walls 8 and 9. The outer end of each of the blocks or slabs 20 is cut away to provide a segment-shaped pocket in which is mounted a segment-shaped block 24 having a concave recess 25 in its straight face, the blocks 24 being mounted upon the inner portions of the blocks $19^x$.

Mounted upon the outer portions of the blocks $19^x$ and spaced from the blocks 24 are segment-shaped blocks 26 having their straight faces provided with concave recesses 27 which oppose the concave recesses 25. The blocks 26 are spaced from the blocks 24 thereby providing a passage 28 which opens into the spaces 22, these latter constituting conduits for the passage of the molten glass from the gathering chamber 5 to the collecting pots.

Interposed between the blocks 26 are filler members 29, Fig. 6, which are flush with the upper faces of the blocks 26. The blocks 24 are flush with the upper faces of the blocks or slabs 20 and the blocks 26 are flush with the blocks 24. The rows $15^x$ form the bottoms of the conduits and the blocks $19^x$ form the bottoms of the passages 28 and also the bottoms of the pots.

Mounted on the extensions 23 and abutting against the end blocks 26 and seated upon the outer rows $18^x$ are closure blocks 30, Fig. 6, for the outer ends of the glass conduits.

The course C is mounted upon the course B and consists of pairs of spaced slabs or blocks 31, Fig. 7, which abut against the walls of the gathering chamber and are mounted upon the blocks or slabs 20 and have their inner faces flush with the walls 21 of the openings 14. The outer ends of the blocks or slabs 31 are curved, and seated against said curved ends of each pair of blocks or slabs is a circular block or slab 32 provided with a centrally-disposed opening 33 having the wall thereof registering with the walls of the concave recesses 25 and 27.

The circular blocks 32 are mounted upon the segment-shaped blocks 24 and 26, the periphery of the blocks 24 and 26 being flush with the periphery of the block 33.

Interposed between the blocks 32 and mounted upon the fillers 29 are filler members 34. The course D is mounted upon the course C and consists of a series of pairs of blocks or slabs 35, Fig. 8, which are of a construction similar to the blocks or slabs 31 and are mounted on these latter and abut at their inner ends against the walls of the gathering chamber.

Mounted against the inner ends of the blocks or slabs 35 are annular members 36, the inner diameter of each of which is greater than the diameter of the opening 33 of the block 32, and these members 36 are mounted upon the circular blocks or slabs 32, the periphery of the members 36 being flush with the periphery of the members 32, the upper face of each member 36 being formed with an annular boss 37.

Interposed between the members 36 are filling members 38 which are mounted upon the members 34. Each set of blocks $19^x$, 24, 26, 32 and members 36 form a glass collecting pot, the blocks 24 and 26 in connection with the members $19^x$ providing the glass inlet passages, the glass entering the pots at the bottom, and the rows $15^x$ in connection with the blocks or slabs 20, 31 and 35 and filling members 34 and 38 provide the conduits for conducting the glass from the openings 14 to the inlet passages.

The tops of the conduits are closed through the medium of the plates 39 which are mounted upon the members 38 and the blocks or slabs 35. The plates 39 are flush with the bosses 37 and have their inner ends extending into pockets 40 formed at the point of junction between the walls of the gathering chamber and the depending portion of the roof 12. The plates 39 are provided with hand grips 41 to enable the convenient removal of the plates when occasion so requires.

Mounted upon the roof 12 is a series of uprights 42, one associating with each pair of glass collecting pots, and to each of the uprights 42 is attached a swinging arm 43 braced by the member 44. The outer end of the arm 43 has depending therefrom an adjustable carrier 45 which is detachably connected to a cover plate 46. The upright 42 is so disposed that when the cover plate 46 closes one of the pots of a pair of pots, the other pot of the pair will be opened to enable the batch of glass to be gathered therefrom. When the arm 43 is swung, it carries the cover 46 therewith to open one pot and close the other pot. By this arrangement the heat is maintained in one pot while a batch of glass is being removed from the other pot of the pair. An operator uses two pots and one of the pots is open while the glass is gathered from the other pot and after the glass has been gathered therefrom the pot is closed by swinging the cover plate 46 upon the boss 37, and such action opens the other pot so that a batch of glass can be gathered therefrom. When the furnace is not in use, suitable means is employed for closing the open pots and which is removed when the operators proceed to remove batches of glass alternately from each pot of a pair of pots.

Brace members in the form of I-beams 47, 48 and 49 are employed to brace the walls of the gathering chamber and also the pot construction.

Gas supply pipes 50 are mounted in the pot structure, each of which is provided with a burner 51 projecting into the conduit for heating the molten glass as it travels from the gathering chamber to the collecting pot.

Built against the pot structure and communicating with the conduits through the medium of the openings 52 is a checker work 53 which communicates by the conduit 54 with a semi-circular common receiving chamber or flue 55 having projecting therefrom the conducting flues 56, 57 and 58, which open into the stack (not shown), dampers 59 being provided for the flues. The openings 52 constitute exhaust outlets for the gases and fumes from the gathering chamber 5.

During the operation of the furnace, gas is admitted through the medium of the burners and upon contacting with the molten glass, it is ignited, thereby heating the glass. The checker work is used for preventing the flame from passing through the flues to the stack.

The gas supplied is utilized for melting as well as keeping the glass in a molten state and is supplied to the furnace in any suitable manner.

In Fig. 9 I have shown a ring which may be employed with the glass pot to act as a barrier to prevent the heat striking the cylinder being drawn, 60 indicating the ring, raised and lowered by any suitable means as 61, and 62 indicating somewhat conventionally, the pot, the heat entering onto the surface of the glass in the pot through the annular heating chamber 63. When the ring is down on top of the glass in the pot it forms a barrier to the heat, and also serves to prevent the cooler glass at the sides being drawn. Pins 64 limit the downward movement of the ring. A cover may be used on the ring.

What I claim is:

1. The combination with a gathering chamber having a side wall provided with spaced openings; of a pot floor extending outward from said side wall below said openings and being provided with spaced substantially cylindrical base blocks arranged between said openings, pairs of spaced segmental blocks mounted on said base blocks with the spaces between the ends of the segments forming glass passages, pot rings superposed one above the other on said segmental blocks, wall members extending from the gathering chamber wall to said pot rings and inner segmental blocks, said wall members being arranged on opposite sides of respective openings in the gathering chamber wall to form passages leading from the gathering chamber wall openings to the passages between the said segmental blocks, and closures for the outer ends of the passages last mentioned.

2. The combination with a gathering chamber having a side wall provided with spaced openings; of a pot floor extending outward from said side wall below said openings and being provided with spaced substantially cylindrical base blocks arranged between said openings, pairs of spaced segmental blocks mounted on said base blocks with the spaces between the ends of the segments forming glass passages, pot rings superposed one above the other on said segmental blocks, wall members extending from the gathering chamber wall to said pot rings and inner segmental blocks, said wall members being arranged on opposite sides of respective openings in the gathering chamber wall to form passages leading from the gathering chamber wall openings to the passage between the said segmental blocks, covers for said last mentioned passages, closures for the outer ends of the last mentioned passages terminating in spaced relation to said covers, a flue, and means affording communication from said flue to the openings at the tops of the closures for the outer ends of the passages.

In testimony whereof I affix my signature in presence of two witnesses.

PIERRE J. PAQUET.

Witnesses:
E. C. CURRY,
H. V. ROWAN.

Copies of this patent may be obtained for five cents each, by addressing the "Commissioner of Patents, Washington, D. C."